United States Patent
Park et al.

(10) Patent No.: US 7,153,810 B2
(45) Date of Patent: Dec. 26, 2006

(54) SILVER DOPED CATALYSTS FOR TREATMENT OF EXHAUST

(75) Inventors: Paul Worn Park, Peoria, IL (US); Carrie L. Boyer, Shiloh, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/874,209

(22) Filed: Jun. 24, 2004

(65) Prior Publication Data
US 2005/0288179 A1    Dec. 29, 2005

(51) Int. Cl.
*B01J 27/053* (2006.01)
*B01J 27/25* (2006.01)
*B01J 27/055* (2006.01)
*B01J 23/50* (2006.01)
*B01D 53/56* (2006.01)

(52) U.S. Cl. .............. 502/217; 502/201; 502/218; 502/347; 502/348; 423/239.1; 423/239.2

(58) Field of Classification Search ........ 502/217, 502/218, 201, 347, 348; 423/239.1, 239.2
See application file for complete search history.

(56) References Cited

U.S. PATENT DOCUMENTS

| | | | |
|---|---|---|---|
| 4,044,102 A * | 8/1977 | Muraki et al. ........... 423/239.1 |
| 4,274,877 A * | 6/1981 | Collier et al. ............ 75/252 |
| 5,559,072 A | 9/1996 | Itoh et al. ............... 502/347 |
| 5,714,130 A * | 2/1998 | Saito et al. ............. 423/239.1 |
| 5,780,002 A * | 7/1998 | Miyadera et al. ........ 423/239.1 |
| 5,935,529 A * | 8/1999 | Saito et al. .............. 422/177 |
| 5,980,844 A | 11/1999 | Kharas .................... 423/213.2 |
| 6,176,078 B1 | 1/2001 | Balko et al. ............. 60/274 |
| 6,232,253 B1 * | 5/2001 | Narula et al. ............ 502/4 |
| 6,284,211 B1 | 9/2001 | Miyadera et al. ........ 423/239.1 |
| 6,314,722 B1 | 11/2001 | Matros et al. ........... 60/274 |
| 6,703,343 B1 * | 3/2004 | Park ....................... 502/355 |
| 6,706,660 B1 * | 3/2004 | Park ....................... 502/304 |
| 2003/0066285 A1 * | 4/2003 | Raybone et al. ......... 60/275 |
| 2003/0171216 A1 * | 9/2003 | Park ....................... 502/355 |
| 2004/0121899 A1 * | 6/2004 | Balmer-Millar et al. ..... 502/60 |

* cited by examiner

*Primary Examiner*—J. A. Lorengo
*Assistant Examiner*—Patricia L. Hailey
(74) *Attorney, Agent, or Firm*—Finnegan, Henderson, Farabow, Garrett & Dunner

(57) ABSTRACT

A method of making an exhaust treatment catalyst includes dispersing a metal-based material in a first solvent to form a first slurry and allowing polymerization of the first slurry to occur. Polymerization of the first slurry may be quenched and the first slurry may be allowed to harden into a solid. This solid may be redistributed in a second solvent to form a second slurry. The second slurry may be loaded with a silver-based material, and a silver-loaded powder may be formed from the second slurry.

18 Claims, 5 Drawing Sheets

SILVER DOPED CATALYSTS FOR TREATMENT OF EXHAUST

U.S. GOVERNMENT RIGHTS

This invention was made with government support under the terms of Contract No. DE-FC05-97OR22579 awarded by the Department of Energy. The government may have certain rights in this invention.

TECHNICAL FIELD

This disclosure relates generally to catalytic exhaust treatment elements and, more particularly, to methods for reducing NOx in exhaust streams using exhaust treatment elements including silver doped catalysts.

BACKGROUND

Internal combustion engines can produce exhaust streams that include various gases and combustion products. Some of these gases, such as nitrogen oxide gases (NOx) including, for example, nitrogen monoxide (NO) and nitrogen dioxide ($NO_2$), can contribute to environmental pollution in the form of acid rain and other undesirable effects. As a result, many regulations have been imposed on engine manufacturers in an attempt to reduce the levels of NOx emitted into the atmosphere.

NOx removal from the exhaust streams of lean burn engines can be especially challenging. Lean burn engines, which may include diesel engines as well as certain spark ignited engines, can operate with an excess of oxygen. Specifically, in a lean burn engine, more oxygen may be supplied to the engine than is necessary to stoichiometrically consume the fuel admitted to the engine. As a result, the exhaust streams of these lean burn engines may be rich in oxygen, which can limit the available techniques suitable for NOx removal.

To reduce the NOx concentrations in the exhaust stream of lean burning engines, a number of lean-NOx catalysts have been developed that may selectively reduce NOx in oxygen rich exhaust streams with hydrocarbon reductants. These lean-NOx catalytic systems may depend on the presence of sufficient levels of hydrocarbon species to be fully effective. The amount of hydrocarbons available in the exhaust streams of many lean burning engines can be low. Therefore, in some applications including active catalytic systems, a hydrocarbon compound such as diesel fuel, for example, may be introduced into the exhaust stream in order to promote reduction of NOx compounds.

Several lean-NOx catalysts have been developed that include alumina in some form. Alumina is known as a durable material, and it has shown promise as a catalyst for lean-NOx reactions at high temperatures. Nevertheless, even alumina-based catalysts have proven problematic. For example, certain catalysts or catalytic systems that have been used with lean burn engines can suffer from low NOx conversion efficiencies, inadequate catalyst durability, low thermal stability, narrow effective temperature ranges, and NOx selectivity limited to only certain compounds.

In an attempt to address the shortcomings of lean-NOx catalysts, various catalyst configurations and compositions have been proposed. For example, U.S. Pat. No. 5,980,844 ("the '844 patent") describes a NOx-reducing catalyst that includes silver oxide particles dispersed on alumina. While the catalyst of the '844 patent may reduce emissions of certain NOx gases, the catalyst may be costly to manufacture in view of the complex processing technique required for producing the small, widely dispersed silver oxide particles of the catalyst.

The disclosed exhaust treatment elements are intended to overcome one or more shortcomings of the prior art systems.

SUMMARY OF THE INVENTION

One aspect of the present disclosure includes a method of making an exhaust treatment catalyst. The method may include dispersing a metal-based material in a first solvent to form a first slurry and allowing polymerization of the first slurry to occur. Polymerization of the first slurry may be quenched, and the first slurry may be allowed to harden into a solid. This solid may be redistributed in a second solvent to form a second slurry. The second slurry may be loaded with a silver-based material, and a silver-loaded powder may be formed from the second slurry.

A second aspect of the present disclosure may include a method of making an exhaust treatment catalyst. The method may include supplying a catalyst support material and selectively sulfating silver sites on the catalyst support material to form the catalyst.

A third aspect of the present disclosure may include an exhaust treatment element, which includes a substrate and a catalyst support material disposed on the substrate. A quantity of silver sulfate may be dispersed within the catalyst support material to form a catalyst.

A fourth aspect of the present disclosure may include an exhaust treatment system, which includes an exhaust stream conduit and an exhaust treatment element disposed in the exhaust stream conduit. The exhaust treatment element may include a substrate, a catalyst support material disposed on the substrate, and a quantity of silver sulfate dispersed within the catalyst support material to form a catalyst.

DETAILED DESCRIPTION

Figure 1:
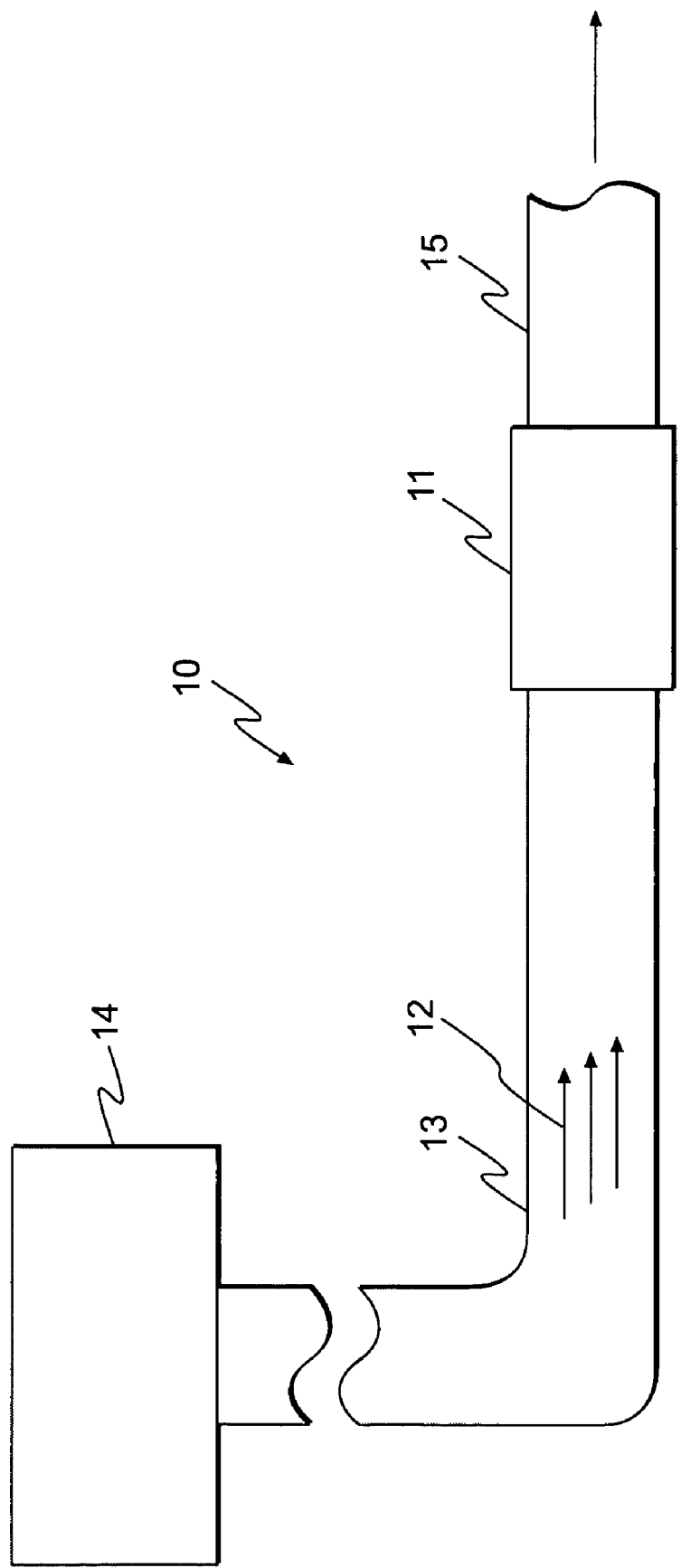
FIG. 1 is a diagrammatic illustration of an exhaust treatment system according to an exemplary disclosed embodiment.

FIG. 1 illustrates an exemplary exhaust system 10 that may include an exhaust treatment element 11 for treating an exhaust stream 12 transferred through exhaust conduit 13. In one disclosed embodiment, exhaust stream 12 may be produced by a lean burn internal combustion engine 14, which may be a diesel engine, a spark ignited engine, or any other type of engine that may be operated with an excess of oxygen. Further, engine 14 may operate in either a stationary role (e.g., power plants, generators, etc.) or in a mobile capacity (e.g., vehicles, moving equipment, etc.). As a common trait of many lean burn engines, the excess oxygen present during combustion may yield NOx in the exhaust stream. Exhaust treatment element 11 may be provided in system 10 to convert at least some of the NOx from exhaust stream 12 into more benign compounds, such as nitrogen gas ($N_2$), carbon dioxide, and water vapor, for example. These compounds may then be expelled into the atmosphere through an exhaust conduit 15.

Figure 2:
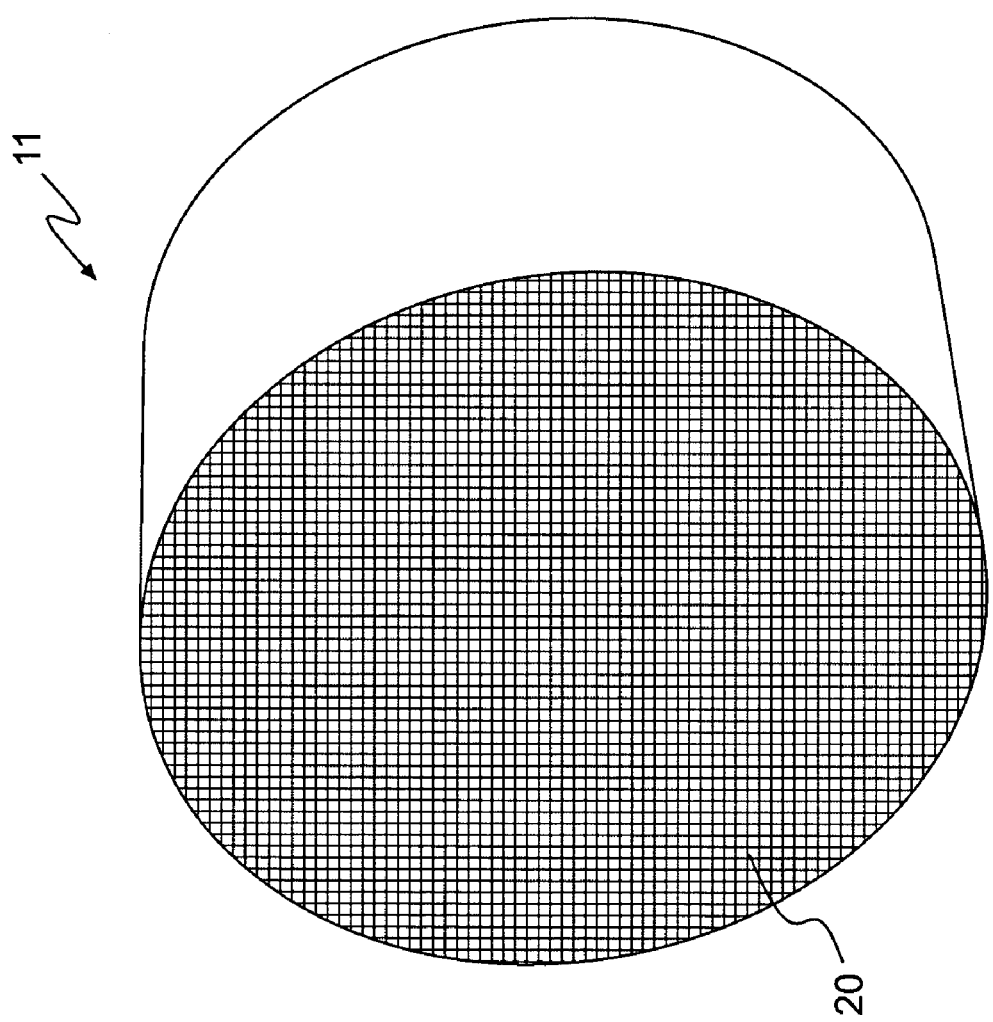
FIG. 2 is a pictorial representation of an exhaust treatment element according to an exemplary disclosed embodiment.

FIG. 2 illustrates exhaust treatment element 11 according to one exemplary embodiment. Exhaust treatment element 11 may be cylindrical, as shown, or any other suitable shape depending on a particular application. A plurality of channels 20 may be formed in exhaust treatment element 11. Channels 20 are openings defined by walls that form a honeycombed structure identified as substrate 30 (see FIG. 3). The term "honeycomb," as used herein, may refer to a structure in which channels 20 have cross sections that may be hexagonal, rectangular, square, circular, or any other suitable shape. Channels 20 may extend through the entire length of exhaust treatment element 11 and allow the passage of exhaust stream 12 through exhaust treatment element 11. Further, catalyst components that may aid in the conversion of NOx in exhaust stream 12 may be deposited on the walls of channels 20.

Figure 3:
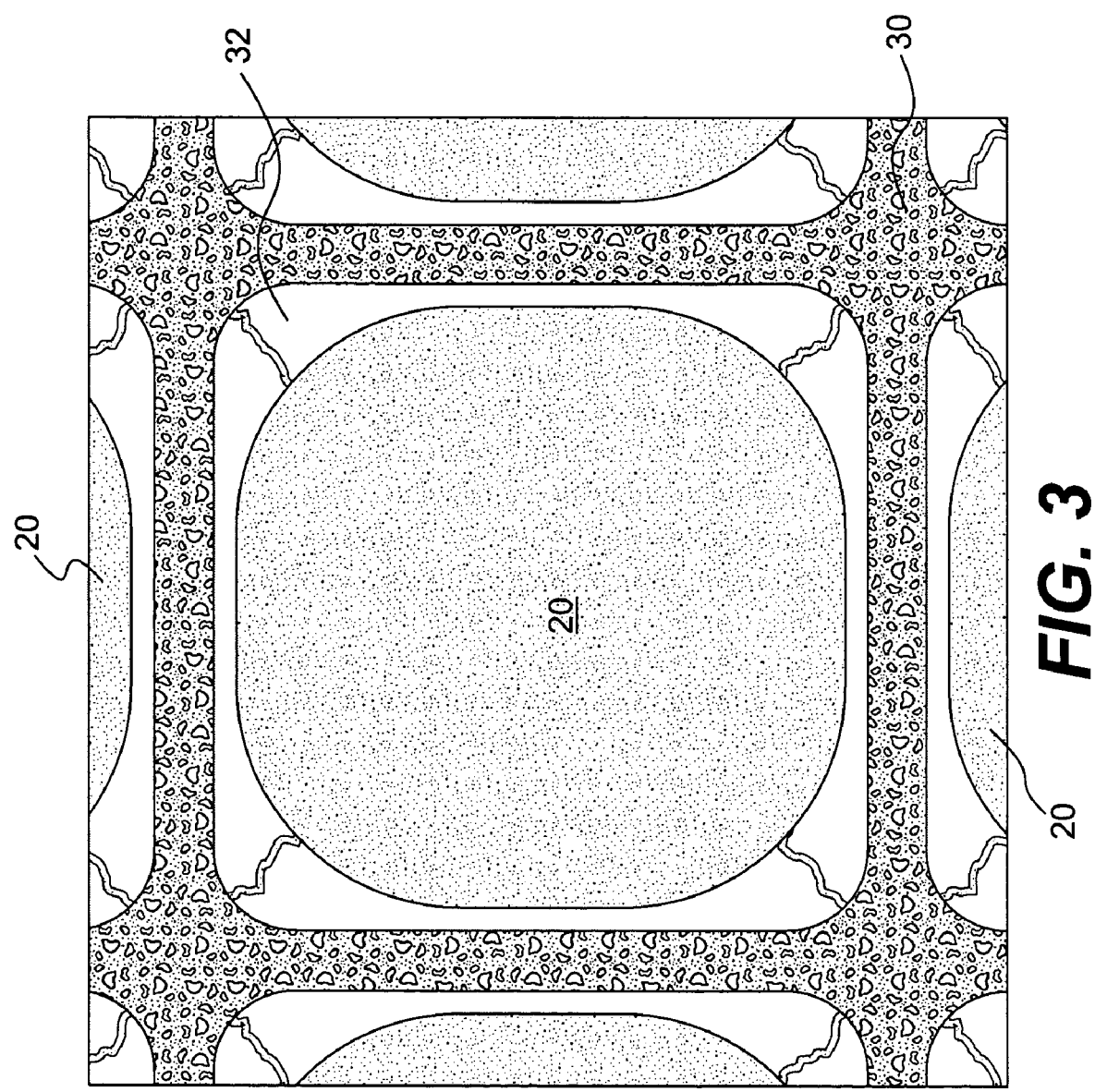
FIG. 3 is a diagrammatic cross-sectional representation of an exhaust treatment element according to an exemplary disclosed embodiment.

FIG. 3 provides a diagrammatic cross-sectional view of exhaust treatment element 11 looking along a longitudinal axis. As shown, substrate 30 includes channels 20 arranged in a honeycomb pattern. Substrate 30 may be a ceramic or a metallic substrate and may include at least one of alumina, cordierite, titania, and FeCr. Other materials, however, may also be used to form substrate 30.

Exhaust treatment element 11 may also include a catalyst 32 deposited on substrate 30. Catalyst 32 may include a catalyst support material and a metal promoter dispersed within the catalyst support material. In one exemplary embodiment, the catalyst support material may include, for example, at least one of alumina and zeolite, and the metal promoter may include silver.

One process for making catalyst 32 may include a single step sol-gel process. In this technique, a metal-containing material may be added to an intermediate product of the sol-gel process such that the catalyst support material generated by the sol-gel process emerges already preloaded with the metal promoter. For purposes of this disclosure, the "single step" process may refer to a process in which a metal promoter precursor, or alternatively, the metal promoter, is added to the catalyst support material by incorporating the metal promoter precursor into at least one step for making the catalyst support material. A second process for making catalyst 32 may include selectively sulfating silver sites on a catalyst support material via an incipient wetness impregnation technique or exposure of a silver-doped catalyst support material to $SO_2$ gas.

The single step sol-gel process for making catalyst 32 may include dispersing a metal-based material in a solvent to form a slurry. In one embodiment including an alumina catalyst support material, the metal-based material may include an aluminum alkoxide, or any other material suitable for producing alumina. The slurry may be maintained at a temperature of between about 115° C. and about 125° C. to allow polymerization of components of the slurry to occur.

At a selected point during the polymerization process (e.g., when a desired amount of polymerized material has been obtained), the polymerization process may be quenched. For example, water, or another appropriate substance, may be added to the slurry to slow or stop the polymerization process. Along with the addition of water, the temperature of the slurry may be reduced to below about 95° C. For example, the temperature of the slurry may be reduced and maintained to within a range of about 85° C. to about 95° C. The quenched slurry may be allowed to harden into a solid, or solid-like, material. In one embodiment, the solid may be a glassy material (e.g., any amorphous or semi-amorphous material) and may include a polymer.

Another slurry may be formed by physically breaking apart the solid material and dispersing the solid material in the quenching liquid (e.g., water). A precursor for the metal promoter of the catalyst may be added to this slurry. For example, the precursor may include a silver-based material. In one embodiment, the silver-based material may include silver nitrate. In addition to the metal promoter precursor, another solvent, such as methanol, ethanol, or propanol (e.g., 2-propanol) or any other appropriate solvent that has a surface tension of less than about 25 mN/m at room temperature, may be added to the slurry. Adding the metal promoter precursor to the slurry at this stage, rather than during the quenching step, can minimize any undesirable changes in the pH of the intermediate products of the sol-gel process.

Once the metal promoter precursor has been added to this slurry, the slurry may be aged for a predetermined length of time and at a preselected temperature. In one embodiment, the slurry may be aged for a period of at least five hours and at a temperature of at least about 80° C. Further, the slurry may be aged overnight at a temperature of between about 80° C. and about 95° C. Alternate embodiments are contemplated, however, where the aging step may be shortened or even omitted.

A powder may be formed by, for example, filtering the slurry. As a result of the disclosed single step sol-gel process, the powder may include the metal promoter dispersed among particles related to the catalyst support material. Thus, in one embodiment, the filtered powder may include a silver-loaded powder.

To complete the formation of the catalyst support material (e.g., to convert any intermediate powder products to a powder including the desired catalyst support material), the filtered powder may be subjected to a calcining process. During the calcining process, the filtered powder may be exposed to an environment, such as air, including nitrogen, oxygen, and water vapor at a temperature of between about 600° C. and about 800° C. Any appropriate water vapor level may be selected, but in one embodiment, the environment may include about 6% water vapor. During the calcining process, any solvents remaining in the filtered powder may be removed. Further, organic portions attached to the powder material may also be dissociated and removed to leave the desired catalyst support material loaded with the metal promoter. In one exemplary embodiment, organic chains of molecules may be removed from the filtered powder to yield a silver-loaded alumina powder. This silver-loaded alumina powder may constitute catalyst 32.

The final quantity of metal promoter included in the catalyst support material may be controlled by selecting the quantity of metal promoter precursor added to the slurry, as previously described. In one embodiment, a sufficient amount of metal promoter precursor may be added to the slurry such that the final catalyst powder (e.g., the silver-loaded alumina) includes between about 1% by weight and about 10% by weight silver. In another embodiment, the final catalyst powder may include between about 2% by weight and about 5% by weight silver. In yet another embodiment, the final catalyst powder may include between about 3% by weight and about 4% by weight silver.

Another process for making catalyst 32 may include selectively sulfating silver sites on a catalyst support material to form a catalyst. This selectively sulfating step may be accomplished using an incipient wetness impregnation technique. In this process, a slurry including a silver sulfate precursor material may be brought into contact with a preexisting catalyst support material. The catalyst support material (e.g., alumina powder) of this embodiment may be made using any suitable formation process such as, for example, sol-gel, incipient wetness, and/or precipitation techniques. To make the slurry, a certain quantity of silver sulfate may be added to and dispersed in a solvent such as water or other suitable solvent.

The catalyst support material may be contacted with the silver sulfate slurry by any appropriate method. In one embodiment, a pipette may be used to introduce the silver sulfate slurry to the catalyst support material. In another embodiment, the catalyst support material and the silver sulfate slurry may be mixed together in any suitable container. Further, any appropriate mixing devices may be used to promote homogeneous mixing of the silver sulfate slurry and the catalyst support material.

The amount of silver sulfate slurry applied to the catalyst support material may be related to the pore volume of the catalyst support material. For example, in one embodiment, the amount of silver sulfate slurry applied to the catalyst support material may be equal to or greater than a total pore volume of the catalyst support material. The disclosed incipient wetness technique may enable the silver sulfate to impregnate much or all of the pore space of the catalyst support material.

In the presently disclosed incipient wetness technique, catalyst 32 may be formed, for example, by drying and calcining the catalyst support material impregnated with silver sulfate. By drying or calcining the catalyst support material, the solvent component of the silver sulfate slurry may be evaporated or decomposed to yield catalyst 32 in the form of a catalyst support material impregnated with a silver sulfate material. In one embodiment, catalyst 32 includes an alumina powder impregnated, or loaded, with silver sulfate.

The disclosed incipient wetness technique may be accomplished through a single exposure of the catalyst support material to the silver sulfate slurry. Alternatively, however, the incipient wetness technique may include multiple exposures to the silver sulfate slurry. For example, after each cycle of exposure to the slurry and subsequent drying, the catalyst support material may be re-exposed to another silver sulfate slurry and re-dried. Each subsequent exposure may contribute to further loading of silver sulfate in the catalyst support material.

The amount of silver sulfate dispersed in the silver sulfate slurry may be selected according to a desired silver content for catalyst 32. In one embodiment, the quantity of silver sulfate dispersed in the slurry may be such that catalyst 32 includes between about 1% by weight and about 10% by weight silver. In another embodiment, the quantity of silver sulfate dispersed in the slurry may be such that catalyst 32 includes between about 2% by weight and about 5% by weight silver.

Additionally, silver sites on the catalyst support material may be selectively sulfated by disposing at least some silver at silver sites of the catalyst support material. This silver may be disposed at the silver sites using a silver precursor material and an incipient wetness technique, similar to the technique described above. Once the silver is disposed on the catalyst support material, at least some of the silver may be converted to silver sulfate by exposing the silver-containing catalyst support material to a sulfur-containing gas (e.g., $SO_2$).

Ultimately, both the disclosed single step sol-gel process and the disclosed incipient wetness impregnation techniques serve as suitable methods for making catalyst 32. As a result of either of these processes, catalyst 32 may be in the form of a powder that may be applied to a substrate to form, for example, exhaust treatment element 11.

Preparation of exhaust treatment element 11 may be accomplished in a variety of ways. An alumina honeycomb or cordierite substrate 30 may be supplied, and catalyst 32 may be formed on substrate 30 using a washcoating technique. Other suitable techniques, however, may also be used.

In one embodiment, the washcoating process may include dispersing catalyst 32 (including the alumina catalyst support material loaded with the silver promoter) into a solvent such as water, for example, to form a slurry. Other solvents may be used depending on the requirements of a particular application. This slurry can be washcoated onto substrate 30. Specifically, the slurry may be applied to the substrate in such a way that at least some of catalyst 32 in the slurry may be transferred to the substrate. For example, substrate 30 may be fully or partially immersed in the slurry. Alternatively, the slurry may be applied to substrate 30 by brushing, spraying, wiping, or any other suitable method. After applying the slurry containing catalyst 32 to substrate 30, the slurry may be allowed to dry, leaving catalyst 32 deposited on substrate 30.

Exhaust treatment element 11 may be subjected to additional processing steps including, for example, drying and/or calcining to remove volatile components from substrate 30 and catalyst 32. Drying may include placing exhaust treatment element 11 in a furnace at a particular temperature and for a particular amount of time. For example, exhaust treatment element 11 may be dried at a temperature of from about 100° C. to about 200° C. for several hours. Calcining may proceed for several hours at temperatures of greater than about 500° C. It will be appreciated that any particular time-temperature profile may be selected for the steps of drying and calcining.

Exhaust treatment element 11 may aid in the reduction of NOx from exhaust stream 12 (FIG. 1). The lean-NOx catalytic reaction is a complex process including many steps. One of the reaction mechanisms, however, that may proceed in the presence of exhaust treatment 11 can be summarized by the following reaction equations:

$$NO + O_2 \rightarrow NOx \qquad (1)$$

$$HC + O_2 \rightarrow \text{oxygenated HC} \qquad (2)$$

$$NOx + \text{oxygenated HC} + O_2 \rightarrow N_2 + CO_2 + H_2O \qquad (3)$$

Catalyst 32, which may include silver dispersed within a catalyst support material, may catalyze the reduction of NOx to $N_2$ gas, as shown in equation (3). Further, as shown in equation (2), a hydrocarbon reducing agent may be converted to an activated, oxygenated hydrocarbon that may interact with the NOx compounds to form organo-nitrogen containing compounds. These materials may possibly decompose to isocyanate (NCO) or cyanide groups and eventually yield nitrogen gas ($N_2$) through a series of reactions, which are summarized above.

INDUSTRIAL APPLICABILITY

The presently disclosed catalysts and methods for making the catalysts may be used with any exhaust treatment element or exhaust treatment system that may benefit from improved NOx conversion efficiency. The high conversion efficiency levels of the disclosed catalysts may be attributed, for example, to the use of the disclosed single step sol-gel catalyst formation method. The disclosed single step sol-gel process may allow for precise control over the pore size, pore volume, and surface area of the catalyst support material (e.g., alumina). This process may also contribute to a substantially uniform dispersion of silver within the catalyst support material. Uniform silver dispersion can minimize the amount of silver that forms silver metal in the catalyst and maximize the amount of silver included in active NOx reducing species (e.g., silver oxide) present in the catalyst.

In other embodiments, the high NOx conversion efficiency levels may be attributed to the use of silver sulfate to provide active NOx conversion sites in the catalyst. For example, in at least some applications, silver sulfate may offer an even higher NOx conversion activity as compared to silver oxide. Further, because silver sulfate decomposes only above about 900° C., the silver sulfate included in the disclosed catalysts remains intact during processing of the catalysts, which may include, for example, calcining catalyst 32 at a temperature of between about 600° C. and about 800° C. Silver nitrate, however, which may be used in the disclosed single step sol-gel process, has a decomposition temperature of approximately 250° C. Therefore, during processing of catalyst 32, silver nitrate may convert to silver oxide.

Figure 4:
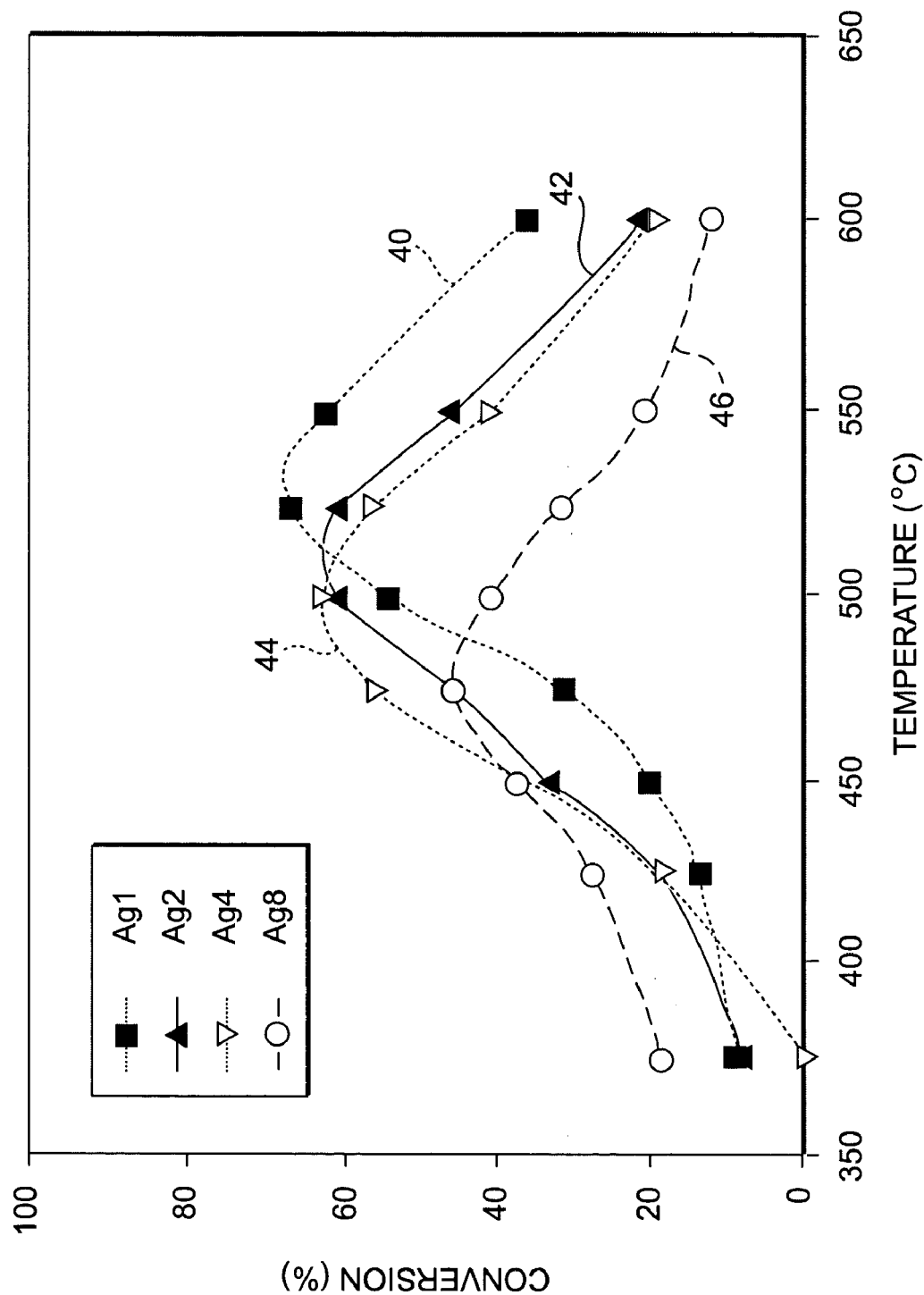
FIG. 4 is a graph that plots NOx conversion percentage as a function of temperature and silver metal loading for various samples prepared in accordance with an exemplary single step sol-gel process.

FIG. 4 a graph that plots NOx conversion percentage as a function of temperature and silver metal loading for four samples prepared in accordance with the disclosed single step sol-gel catalyst formation process. Specifically, curve 40 represents the NOx conversion efficiency of a catalyst loaded with about 1% silver by weight. Curve 42 represents the NOx conversion efficiency of a catalyst loaded with about 2% silver by weight. Curve 44 represents the NOx conversion efficiency of a catalyst loaded with about 4% silver by weight, and curve 46 represents the NOx conversion efficiency of a catalyst loaded with about 8% silver by weight. For each of the samples, the exhaust stream flowed over each of the samples included 0.1% NOx, 9% $O_2$, and 7% $H_2O$ at a space velocity of 30,000 $h^{-1}$. The exhaust stream also included a hydrocarbon reductant in the form of 0.1% propene.

As shown in FIG. 4, the 1% silver sample represented by curve 40 exhibited the highest peak NOx conversion efficiency. Conversely, the 8% silver sample represented by curve 46 demonstrated the lowest NOx conversion efficiency. Still, the conversion efficiency of the 8% sample was nearly 50%, which is significantly higher than many conventional catalyst systems. The 2% silver and 4% silver samples (i.e., curves 42 and 44, respectively) demonstrated the best overall performance. These two samples both exhibited relatively high NOx conversion efficiency values (e.g., above about 60%) and also demonstrated broad effective temperature ranges. For example, both samples maintained greater than 50% NOx conversion efficiency over a broad temperature range centered approximately around the relatively low temperature of 500° C. The disclosed single step sol-gel process may result in a catalyst demonstrating high $NO_x$ reduction performance over a broad range of metal loading values.

Figure 5:
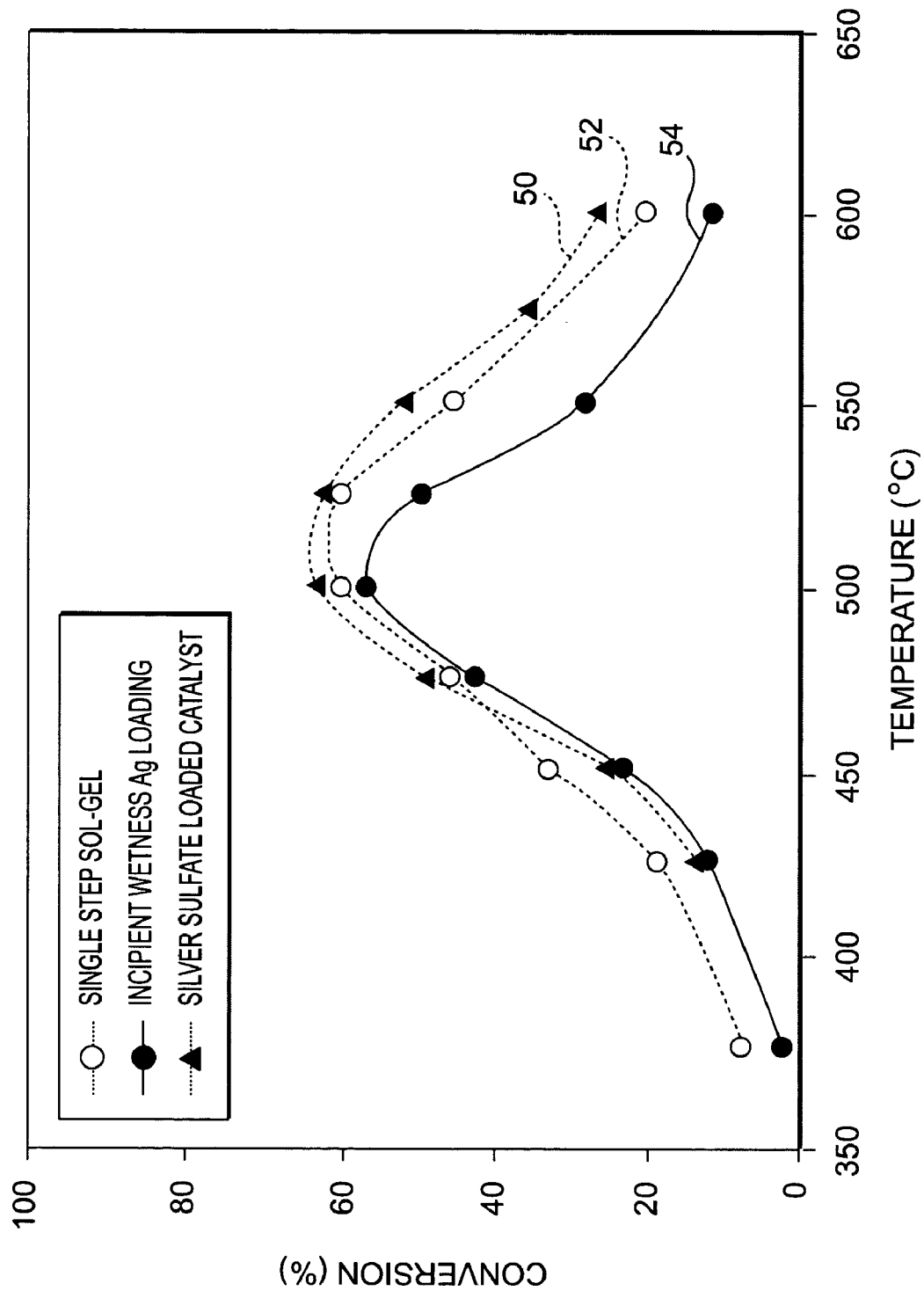
FIG. 5 is a graph that plots NOx conversion percentage as a function of temperature for various samples prepared according to exemplary disclosed processes.

FIG. 5 is a graph that plots NOx conversion percentage as a function of temperature for various samples containing similar amounts of silver, but prepared according to different disclosed processes. Each sample included about 2% silver by weight. The first sample, represented by curve 50, was prepared by loading silver sulfate into the catalyst support material using an incipient wetness technique. The second sample, represented by curve 52, was prepared using the disclosed single step sol-gel process using silver nitrate. The second sample, however, included silver oxide, rather than silver sulfate, as the active material. The third sample, represented by curve 54, was prepared using an incipient wetness technique using silver nitrate. The exhaust stream flowed over each of the catalysts included 0.1% NO, 9% $O_2$, and 7% $H_2O$ at a space velocity of 30,000 $h^{-1}$. The exhaust stream also included a hydrocarbon reductant in the form of 0.1% propene.

As illustrated in FIG. 5, the first sample (curve 50) had the highest peak NOx conversion efficiency (about 65%) and the broadest effective temperature range. The second sample (curve 52) demonstrated the next highest NOx conversion efficiency and effective temperature range, and the third sample (curve 54) was lower in both NOx conversion efficiency and effective temperature range as compared to the first and second samples. The graph of FIG. 5 illustrates the performance benefits that may be obtained using catalysts prepared according to the disclosed single step sol-gel methods or prepared using silver sulfate precursor materials.

It will be apparent to those skilled in the art that various modifications and variations can be made in the described catalyst systems without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of making an exhaust treatment catalyst comprising:
   dispersing a metal-based material in a first solvent to form a first slurry;
   allowing polymerization of the first slurry to occur;
   quenching polymerization of the first slurry and allowing the first slurry to harden into a solid;
   redistributing the solid in a second solvent to form a second slurry;
   loading the second slurry with a silver-based material; and
   forming a silver-loaded powder from the second slurry.

2. The method of claim 1, further including maintaining the first slurry at a temperature of between about 115° C. and about 125° C. prior to quenching polymerization.

3. The method of claim 1, wherein quenching includes adding water to the first slurry.

4. The method of claim 1, wherein quenching includes reducing a temperature of the first slurry to below about 95° C.

5. The method of claim 1, wherein the solid includes a glassy material.

6. The method of claim 1, wherein quenching polymerization of the first slurry includes adding water to the first slurry, and wherein redistributing the solid includes breaking apart the solid and dispersing the solid in the water to form the second slurry.

7. The method of claim 1, further including aging the second slurry at a temperature of at least 80° C. for a period of at least five hours.

8. The method of claim 1, wherein loading the second slurry includes adding a silver-based material and at least one of methanol, ethanol, and propanol to the second slurry.

9. The method of claim 8, wherein the silver-based material includes silver nitrate.

10. The method of claim 1, wherein forming the silver-loaded powder includes filtering the powder from the second slurry and calcining the powder.

11. The method of claim 1, wherein the silver-loaded powder includes between about 1% by weight and about 10% by weight silver.

12. The method of claim 1, wherein the silver-loaded powder includes between about 2% by weight and about 5% by weight silver.

13. The method of claim 1, wherein the silver-loaded powder includes between about 3% by weight and about 4% by weight silver.

14. The method of claim 1, wherein the metal-based material includes aluminum and wherein the silver-loaded powder includes alumina.

15. A method of making an exhaust treatment catalyst comprising:
   supplying a catalyst support material; and
   selectively sulfating silver sites on the catalyst support material to form the catalyst;
   wherein selectively sulfating silver sites on the catalyst support material includes depositing at least some silver at the silver sites and exposing the catalyst support material to $SO_2$ gas.

16. The method of claim 15, wherein the catalyst support material includes at least one of alumina and zeolite.

17. The method of claim 15, wherein the catalyst includes between about 1% by weight and about 10% by weight silver.

18. The method of claim 15, wherein the catalyst includes between about 2% by weight and about 5% by weight silver.

* * * * *